(12) United States Patent
Zhong et al.

(10) Patent No.: US 8,095,964 B1
(45) Date of Patent: Jan. 10, 2012

(54) PEER COMPUTER BASED THREAT DETECTION

(75) Inventors: Gary Zhong, Los Angeles, CA (US); Shaun P. Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 700 days.

(21) Appl. No.: 12/202,144

(22) Filed: Aug. 29, 2008

(51) Int. Cl.
*G06F 7/04* (2006.01)
*G06F 15/16* (2006.01)
*G06F 17/30* (2006.01)
*H04L 29/06* (2006.01)

(52) U.S. Cl. ........................................................ 726/4
(58) Field of Classification Search ........................ 726/4
See application file for complete search history.

(56) References Cited

U.S. PATENT DOCUMENTS

| 7,895,651 B2 * | 2/2011 | Brennan | 726/22 |
| 2008/0201722 A1 * | 8/2008 | Sarathy | 719/311 |

OTHER PUBLICATIONS

Rubenking, N., "Silent but Deadly Malware Protection", Norton 360 version 2.0 Review, PCMag.com, Mar. 13, 2008, 2 pages, [online] [Retrieved on Mar. 6, 2009] Retrieved from the Internet <URL:http://www.pcmag.com/article2/0,2817,2275867,00.asp>.

* cited by examiner

*Primary Examiner* — Kambiz Zand
*Assistant Examiner* — Stephen Sanders
(74) *Attorney, Agent, or Firm* — Fenwick & West LLP

(57) ABSTRACT

A threat detection event indicating a detection of a malware entity is identified at a client. Threat information associated with the malware entity is identified responsive to the threat detection event, the threat information for detecting the malware entity, wherein at least some of the threat information is unaffected by variance associated with the malware entity. The threat information is reported to a peer client of the client. Peer threat information describing a peer malware entity detected at the peer client is received at the client from the peer client via a network and used to examine the client for the peer malware entity.

16 Claims, 6 Drawing Sheets

US 8,095,964 B1

PEER COMPUTER BASED THREAT DETECTION

BACKGROUND OF THE INVENTION

1. Field of the Invention

This invention pertains in general to computer security and in particular to the identification of malware.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Security computer systems and software for counteracting malware typically operate by seeking to identify malware using malware signatures and/or heuristics. Malware signatures contain data describing characteristics of known malware and can be used to determine whether an entity such as a computer file or a software application contains malware. Malware heuristics contain data describing behaviors performed by malware entities. Typically, malware signatures and heuristics are generated by a provider of security software and deployed to security software on a client computer. The malware signatures are then used by the security software to scan a set of software applications stored on the client computer for malware. The security software uses the malware heuristics to determine whether behaviors of entities on the client computer indicate that the entity is malware.

The use of malware signatures and heuristics to detect malware is complicated by the large variance in behavior and characteristics exhibited by malware. This variance is often based on the computer system on which a piece of malware is executing, herein referred to as "system specific variance". System specific variance may be due to differences in operating systems, resources, hardware components, files and software applications (e.g. such as security software or patches) specific to computer systems. For example, a heuristic describing a behavior of known malware may not detect the malware if the malware is not able to perform the behavior because a particular software application relied upon by the malware is not installed on the system.

The behavior and characteristics exhibited by malware may also vary over time, herein referred to as "temporal variance". Temporal variance may be due to the different behaviors associated with different stages of malware attacks (i.e. the malware "life cycle"). For instance, a heuristic describing a behavior specific to a virus dropper may detect the virus dropper only when it is active.

Characteristics and behaviors exhibited by malware may also vary due to polymorphisms in the malware. Polymorphisms are small changes to data associated malware that may alter the characteristics of the malware. Polymorphisms may also cause variance in the behaviors exhibited by malware.

The use of additional malware signatures and heuristics cannot fully compensate for temporal, system specific and polymorphic variance in malware characteristics and behaviors. Further, due to the large amount of malware to which a computer system can be exposed, increasing the number of new malware signatures and malware heuristics is not a scalable approach to compensate for variation in characteristics and behaviors. Accordingly, there is a need in the art for methods of malware detection which compensate for this variation.

BRIEF SUMMARY

The above and other needs are met by systems, methods, and computer program products for providing threat information to a peer client.

One aspect provides a computer-implemented method for providing threat information to a peer client. A threat detection event indicating a detection of a malware entity is identified. Threat information associated with the malware entity is identified responsive to the threat detection event, the threat information for detecting the malware entity, wherein at least some of the threat information is unaffected by variance associated with the malware entity. The threat information is reported to the peer client.

Another aspect is embodied as a computer-readable storage medium encoded with computer program code for providing threat information to a peer client according to the method described above.

In another aspect, the described embodiments provide a computer system for providing threat information to a peer client. The system comprises a processor and a memory. The system further comprises a malware detection module stored in the memory and executable by the processor to identify a threat detection event indicating a detection of a malware entity. The system further comprises a peer threat evaluation module stored in the memory and executable by the processor to identify threat information associated with the malware entity responsive to the threat detection event, the threat information for detecting the malware entity, wherein at least some of the threat information is unaffected by variance associated with the malware entity. The system further comprises a peer threat reporting module stored in the memory and executable by the processor to report the threat information to the peer client.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
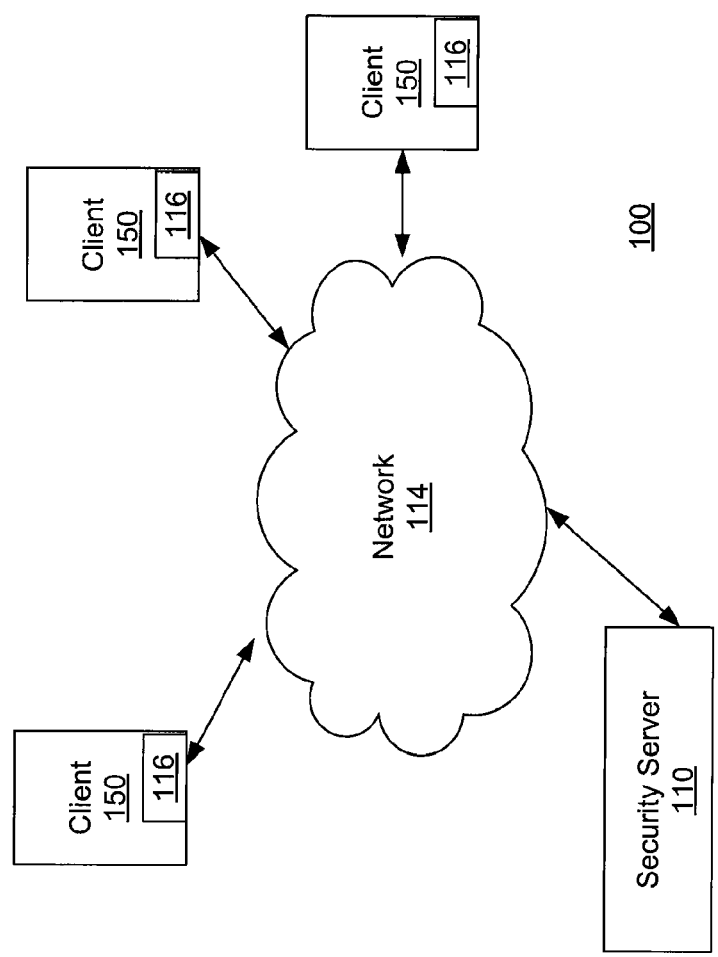
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

The security server 110 interacts with the clients 150 via the network 114. The security server 110 provides malware signatures to the clients 150. The security server 110 also provides malware heuristics to the clients 150. In some embodiments the security server also organizes sets of clients 150 into peers based on characteristics of the clients and/or other criteria.

The clients 150 interact with other clients through the network 114. The clients 150 that a particular client 150 interacts with through the network 114 are herein referred to as its "peer clients". The number and type of peer clients can vary in different embodiments. In one embodiment, the clients 150 are located at an enterprise such as a business or school and are connected by a local area network (LAN). The individual clients 150 recognize the other clients 150 connected to the LAN and self-organize into a set of peers. In another embodiment, the peer clients 150 register with the security server 110. The clients 150 receive address information for their peers from the security server 110.

Each of the clients 150 executes a peer based security engine 116 to detect suspicious entities and malware. The peer based security engine 116 uses the malware signatures and malware heuristics provided by the security server 110 to identify a malware threat. The peer based security engine 116 analyzes the identified malware threat to identify threat information including a method of detecting the malware threat. The peer based security engine 116 transmits the threat information to the peer based security engines 116 executing on its peer clients 150. The peer based security engines 116 executing on the peer clients 150 receive and store the threat information on the peer clients 150. The peer based security engine 116 executing on the peer clients 150 analyze entities such as software applications or files associated with the peer clients 150 according to the method of detecting the malware threat included in the threat information.

In one embodiment, a client 150 is a computer used by one or more users to perform activities including downloading, installing, and/or executing software applications. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

This approach leverages the collective system, temporal, and polymorphic variance affecting malware threats at a plurality of different clients 150 in order to detect the malware threats. Using threat information identified and reported by peer clients 150, a client 150 executing the peer based security engine 116 can detect malware threats that the client 150 might otherwise not detect due to the variance. Thus, the approach is well-suited to computing environments in which clients 150 are exposed to numerous malware threats that exhibit system specific, temporal, and/or polymorphic variance.

Leveraging threat information reported by peer clients 150 to compensate for variance in malware behavior and characteristics further allows for a reduction in the number of malware signatures and heuristics necessary to accurately detect malware threats. Consequently, this approach allows for the identification of malware threats that exhibit variance in behavior and characteristics using a scalable set malware signatures and malware heuristics.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
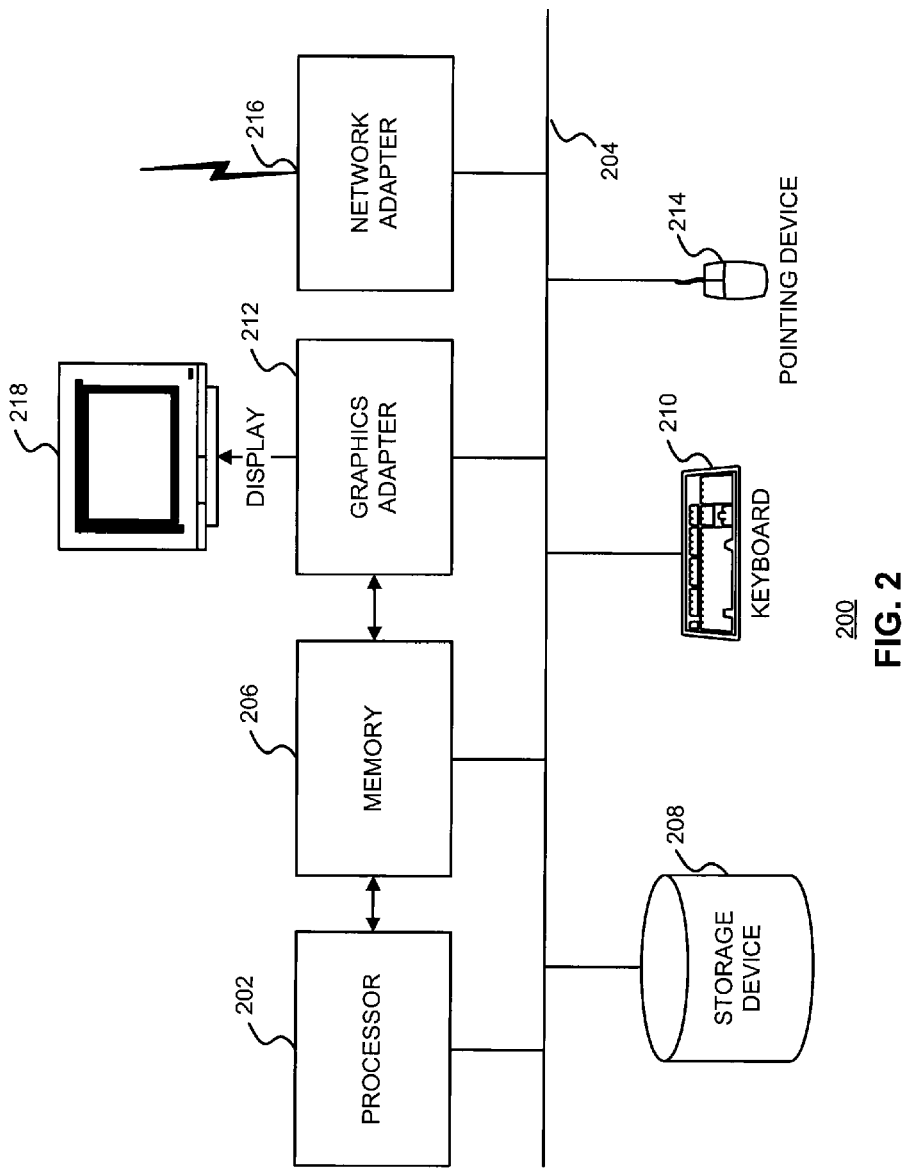
FIG. 2 is a high-level block diagram illustrating a typical computer for use as a security server 110 or a client 150.

FIG. 2 is a high-level block diagram illustrating a typical computer 200 for use as a security server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
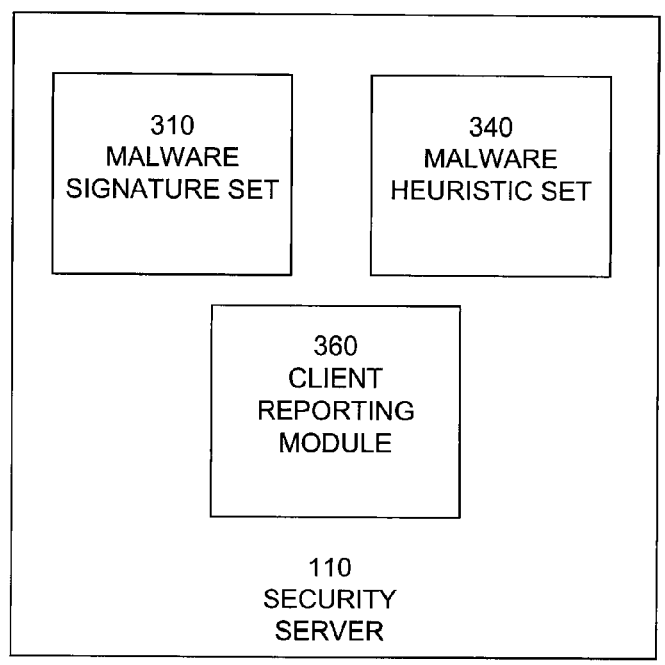
FIG. 3 is a high-level block diagram illustrating a detailed view of a security server 110 according to one embodiment.

FIG. 3 is a high-level block diagram illustrating a detailed view of the security server 110 according to one embodiment. As shown in FIG. 3, the security server 110 includes multiple modules. Those of skill in the art will recognize that other embodiments of the security server 110 can have different and/or other modules than the ones described here, and that the functionalities can be distributed among the modules in a different manner.

The malware signature set 310 contains a set of malware signatures. A malware signature is a characteristic that is used to uniquely identify an entity that is malware. These characteristics can include: hashes identifying an entity, metadata associated with an entity, patterns found within an entity and patterns found in memory after the entity is executed. In most embodiments, the malware signatures are generated by a security software developer. The number of malware signatures in the signature set 310 may range from hundreds malware signature to millions of malware signatures. The malware signature set 310 can be stored in any way on the security server, for example, as a file or database. In some embodiments, the signature set 310 will include information regarding the type of malware threats they have been generated to identify.

The malware heuristic set 340 contains a set of malware heuristics used to identify malware. A malware heuristic specifies behaviors and actions performed by an entity that indicate the entity is malware. These behaviors and actions can include: modifications to the computer system made by the entity, modifications to files on the computer system made by the entity, network interactions associated with the entity, communications between the entity and the operating system, system resources (e.g. central processing unit (CPU) cycles, memory) used by the entity, applications or files that the entity generates (e.g. child malware) and software applications with which the entity interacts. Network interactions associated with the entity can include: other entities (e.g. networks or websites) the entity attempts to communicate with through the network 114, messages sent by the entity using the network 114 and the communication port the entity interacts with to access the network 114. In some embodiments, messages sent by the entity may be represented as pattern of a byte stream generated by monitoring the entity's interactions with the network 114.

In most embodiments, the malware heuristics are created by a security software developer. The number of heuristics in the malware heuristic set 340 may range from one malware heuristic to hundreds of thousands of malware heuristics. The malware heuristic set 340 can be stored in any way on the security server 110, for example, as a file or database. In some embodiments, the malware heuristic set 340 will include information regarding the type of malware threats they have been created to identify.

The client reporting module 360 communicates with the clients 150 via the network 114. The client reporting module 360 transmits the malware signature set 310 and the malware heuristic set 340, or subsets thereof, to the clients 150. According to the embodiment, the client reporting module 360 may transmit the malware signature set 310 and/or the malware heuristic set 340 to the clients 150 on a periodic basis or whenever updates are made to the malware signature set 310 and/or the malware heuristic set 340. In some embodiments, the client reporting module 360 receives information from the clients 150 such as information indicating malware threat detection events or information about malware threats.

Figure 4:
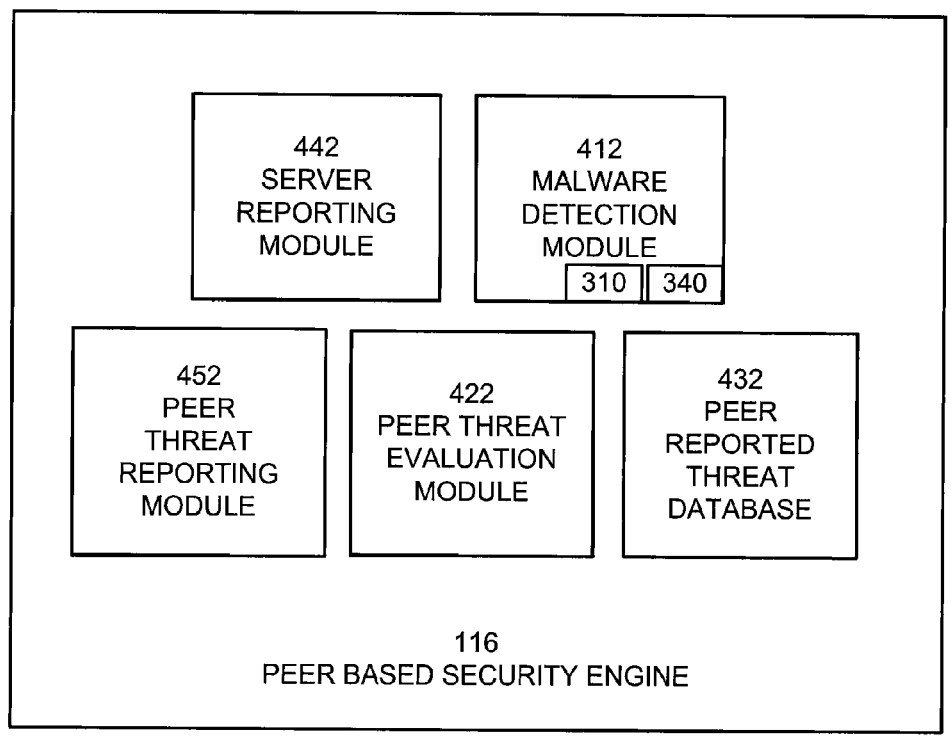
FIG. 4 is a high-level block diagram illustrating a detailed view of a peer based security engine 116 according to one embodiment.

FIG. 4 is a high-level block diagram illustrating a detailed view of the peer based security engine 116 according to one embodiment. In some embodiments, the peer based security engine 116 is incorporated into an operating system executing on the client 150 while in other embodiments the peer based security engine 116 is a standalone application or part of another product. As shown in FIG. 4, the peer based security engine 116 includes several modules. Those of skill in the art will recognize that other embodiments of the peer based security engine 116 can have different and/or other modules than the ones described here, and that the functionalities can be distributed among the modules in a different manner. In addition, the functions ascribed to the peer based security engine 116 can be performed by multiple clients 150.

The server reporting module 442 communicates with the security server 110 via the network 114. The server reporting module 442 receives the malware signature set 310 and the malware heuristic set 340 from the security server 110. According to the embodiment, the server reporting module 442 may receive the malware signature set 310 and the malware heuristic set 340 on a periodic basis or whenever updates have been made to the malware signature set 310 and/or malware heuristic set 340 at the security server 110. The server reporting module 442 provides the malware detection heuristic set 340 and malware signature set 310 to the malware detection module 412. In some embodiments, the server reporting module 442 transmits threat information identified by the peer threat evaluation module 422 to the security server 110.

The malware detection module 412 detects malware threats based on the malware signature set 310 and malware heuristic set 340. The malware detection module 412 scans the storage device 208 or memory 206 associated with the client 150 to identify information associated with entities such as files or software applications that are installed or stored on the storage device 208 or memory 206. The malware detection module 412 determines whether the information associated with the entities corresponds to characteristics specified the malware signature set 310.

The malware detection module 412 may scan the storage device 208 or memory 206 associated with the client 150 at a scheduled time or whenever a new entity is installed or stored on the client 150. In some embodiments, the malware detection module 412 may scan the storage device 208 or memory 206 based on a scheduled time specific to the client 150 executing the peer based security engine 116. In these embodiments, the client 150 and its peer clients 150 are assigned scheduled scan times in order to rotate scan times between the client 150 and its peer clients 150.

The malware detection module 412 further detects malware threats by monitoring entities installed or stored on the storage device 208 or memory 206 in order to identify behaviors associated with the entities that indicate that the entities are malware. The malware detection module 412 determines whether the behaviors performed by the entities correspond to behaviors specified in the malware heuristic set 340. In most embodiments, the malware detection module 412 continuously monitors the entities installed or stored on the storage device 208 or memory 206. In some embodiments, the malware detection module 412 periodically monitors the entities installed or stored on the storage device 208 or memory 206.

A threat detection event occurs when data in the information associated with an entity corresponds to the characteristics specified by a malware signature set 310 and/or the behaviors associated with an entity correspond to one or more behaviors specified in the malware heuristic set 340. The malware detection module 412 reports a threat detection event to the peer threat evaluation module 422.

The malware detection module 412 quarantines the malware threat identified in a threat detection event for analysis by the peer threat evaluation module 422. The malware threat may be quarantined, for example, by configuring the client 150 to prohibit execution of the malware threat and/or taking other actions to prevent any malicious code in the malware threat from causing harm. In some embodiments, the malware detection module 412 further remediates the client 150 responsive to the threat detection event, for example by removing the malware threat and/or repairing corrupted entities on the client.

The peer threat evaluation module 422 analyzes malware threats identified by the malware detection module 412 in order to identify threat information. Threat information is information that is used to uniquely identify the malware threat. The peer threat evaluation module 422 identifies threat information such that the majority of the threat information is unaffected by system specific variance, temporal variance or variance due to malware polymorphisms.

The peer threat evaluation module 422 identifies threat information that is invariant over system specific variance and temporal variance including: the size of the malware threat, the date that the malware threat was last executed or downloaded, a source of the malware threat (e.g. a website the malware threat was downloaded from), a name associated with the malware threat, one or more registry keys generated by the malware threat, the type of malware threat (e.g. virus, worm) and the aspects of the client affected by the malware threat. If the malware threat is a virus, the peer threat evaluation module 422 further identifies the date or version of the virus definition with which the malware was detected. In some embodiments, the threat information further includes one or more other behaviors or characteristics associated with the malware threat identified by the malware detection module 412. In one embodiment, the threat information includes a behavior profile comprising information describing the set of behaviors and actions performed by the malware threat that are identified by the malware detection module 412.

In some embodiments, the threat information further includes a fingerprint specific to the malware threat. The peer threat evaluation module 422 identifies metadata describing characteristics of the malware threat and combines the metadata to generate the fingerprint. The metadata is identified such that the majority of the characteristics are invariant over polymorphisms in the malware threat. According to the embodiment, the metadata may include: instructions performed by the malware threat, hashes generated from the malware threat, bit sequences generated from the malware threat, strings referenced in information associated with the malware threat and other entities associated with the malware threat.

The threat information identified by the peer threat evaluation module 422 further includes one or more methods for detecting the malware threat. Each method for detecting the threat specifies a subset of the threat information to use in detecting the malware threat and a method of determining whether the entity corresponds to the malware threat based on the subset of the threat information. In most embodiments, one or more methods corresponding to one or more subsets of the threat information are specified in the threat information.

In embodiments where the threat information includes a fingerprint specific to the malware threat, the method for detecting the malware threat comprises generating a similarity value which indicates a similarity between the fingerprint and metadata associated with an entity and determining whether the entity corresponds to the malware threat based on the similarity value. According to the embodiment, the similarity value may a binary value indicating whether or not the entity corresponds to a malware threat or a continuous value indicating a degree of similarity between the entity and the malware threat.

In some embodiments, the peer threat evaluation module 422 analyzes entities according to the behavior profile included in the threat information and the method of detecting the malware threat comprises determining a correspondence between the behavior profile and the behaviors and actions performed by the entity. Determining a correspondence between the behavior profile and the behaviors and actions performed by the entity can comprise monitoring the entity using the behaviors and actions specified in the behavior profile and/or comparing behaviors and actions previously performed by the entity with the behaviors and actions specified in the behavior profile. In a specific embodiment, determining a correspondence between the behavior profile and the behaviors and actions performed by the entity comprises determining a correspondence between the information describing network interactions in the behavior profile and network interactions associated with the entity.

The peer threat evaluation module 422 communicates with the peer reported threat database 432 to store the identified threat information in association with indicia specifying that the malware threat was identified at the client 150. The peer reported threat database 432 further stores threat information received from peer clients 150 in association with indicia specifying that the malware threat described by the threat information was identified at the peer clients 150.

A peer threat reporting module 452 communicates with peer clients 150 via the network 114 to transmit and receive threat information. The peer threat reporting module 452 transmits threat information identified by the peer threat evaluation module 422 to its peer clients 150. The peer threat reporting module 452 receives threat information from peer clients 150 and stores the received threat information in the peer reported threat database 432. The peer threat reporting module 452 transmits and receives threat information over the network 114 using a secure communication channel. In a specific embodiment, the threat information is transmitted over the network 114 using an Open Systems Interconnection Basic Reference Model (OSI model) and the threat information is transmit using a transport layer of the OSI model.

The peer threat evaluation module 422 further identifies malware threats at the client 150 based the threat information received from peer clients 150. The peer threat evaluation module 422 identifies threat information stored in the peer reported threat database 432 corresponding to malware threats identified by peer clients 150. In one embodiment, the peer threat evaluation module 422 identifies threat information reported by peer clients whenever new threat information is received and stored in the peer reported threat database 432. In another embodiment, the peer threat evaluation module 422 identifies new threat information in the peer reported threat database 432 on a periodic (e.g. hourly, daily) basis.

The peer threat evaluation module 422 analyzes entities stored in the memory 206 or storage device 208 associated with the client 150 according to the method(s) of detecting the malware threat specified in the threat information. In some embodiments, the peer threat evaluation module 422 generates a similarity value and determines whether the entity corresponds to a malware threat based on the similarity value as described above.

The peer threat evaluation module 422 identifies that a threat detection event has occurred responsive to determining that the entity corresponds to the malware threat. The peer threat evaluation module 422 communicates the malware threat detection event to the malware detection module 412. The malware detection module 412 quarantines the entity that corresponds to the malware threat and/or remediates the client 150 as described above.

Figure 5:
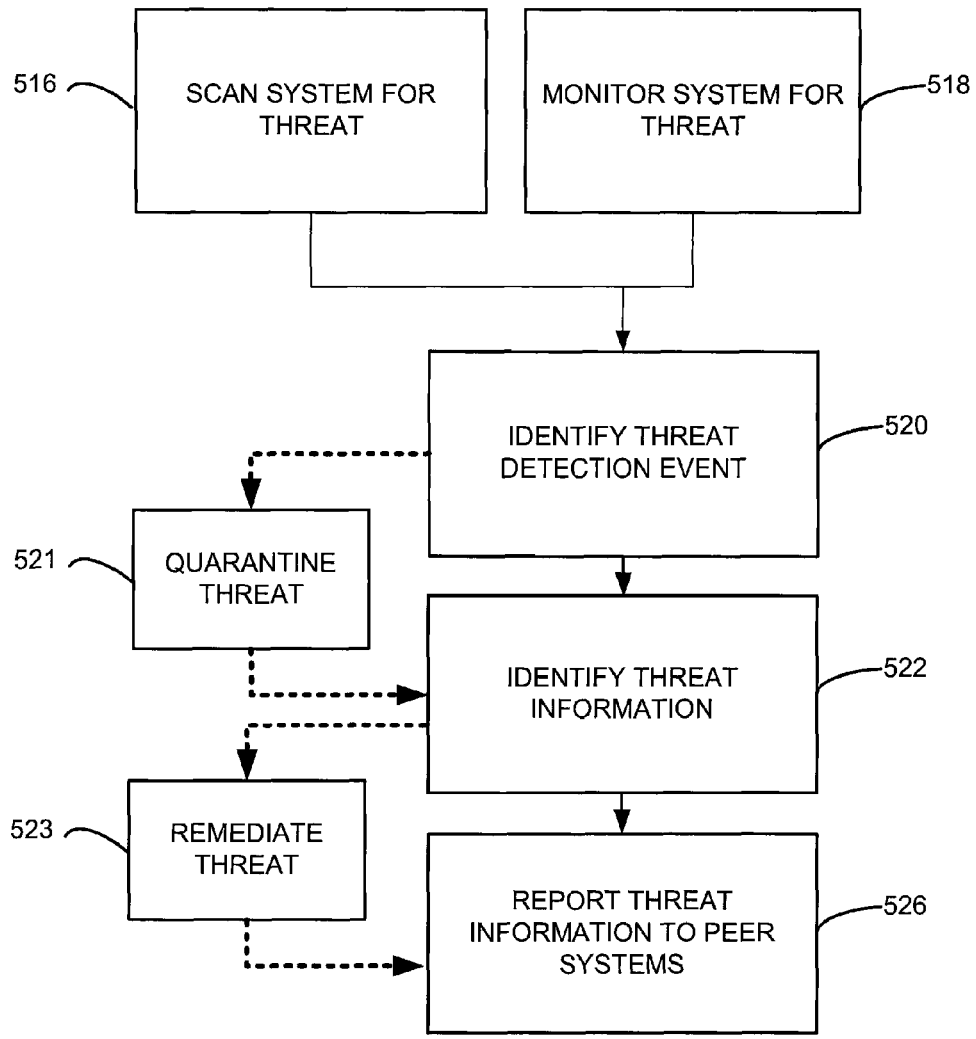
FIG. 5 is a flowchart illustrating steps performed by the peer based security engine 116 to identify and report threat information according to one embodiment.

FIG. 5 is a flowchart illustrating steps performed by the peer based security engine 116 to provide threat information to peer clients 150 according to one embodiment. Other embodiments perform the illustrated steps in different orders, and/or perform different or additional steps. Moreover, some of the steps can be performed by engines or modules other than the peer based security engine 116.

The peer based security engine 116 scans 516 the client 150 system using the malware signature set 310 received from the security server 110. The peer based security engine 116 also monitors 518 the client 150 system using the malware heuristics set 340 received from the security server 110. The peer based security engine 116 identifies 520 a threat detection event based on the scanning 516 and/or monitoring 518. In some embodiments, the peer based security engine 116 quarantines 521 the malware threat identified in the threat detection event. The peer based security engine 116 identifies 522 threat information based on the threat detection event. In some embodiments, the peer based security engine 116 remediates 523 the client 150. The peer based security engine 116 reports 526 the threat information to peer clients 150.

Figure 6:
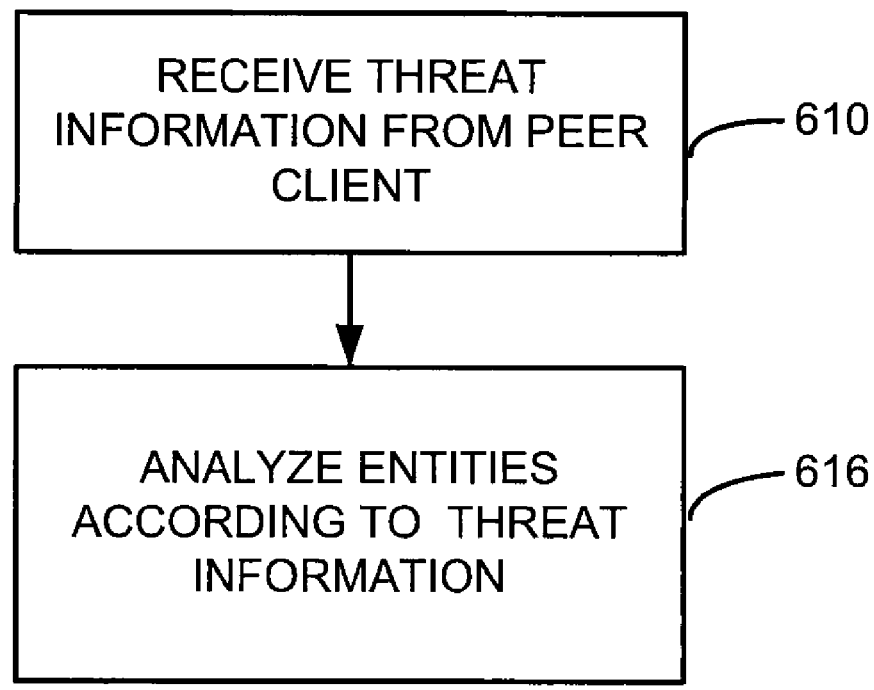
FIG. 6 is a flowchart illustrating steps performed by the peer based security engine 116 to analyze an entity associated with a client 150 using peer reported threat information according to one embodiment.

FIG. 6 is a flowchart illustrating steps performed by the peer based security engine 116 on the client 150 to detect malware threats based on peer-reported threat information according to one embodiment. Other embodiments perform the illustrated steps in different orders, and/or perform different or additional steps. Moreover, some of the steps can be performed by engines or modules other than the peer based security engine 116.

The peer based security engine 116 receives 610 peer reported threat information from peer clients 150. The peer based security engine 116 analyzes 616 the entities stored in memory 206 or a storage device 208 associated with the client 150 system according to the threat information. In some embodiments, the peer based security engine 116 can quarantine an entity and/or remediate the client 150 as described above responsive to an analysis 616 indicating that an entity is a malware threat The above description is included to illustrate to a client 150 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of providing threat information, comprising:
  receiving, at a first peer client of a plurality of peer clients of a security server on a network, security information from the security server;
  identifying, using the security information, a threat detection event indicating a detection of a malware entity at the first peer client;
  identifying, at the first peer client, threat information associated with the malware entity responsive to the threat detection event, the threat information for detecting the malware entity wherein at least some of the threat information is unaffected by variance associated with the malware entity; and
  transmitting the threat information from the first peer client to a second peer client of the plurality of peer clients on the network, wherein the second peer client is adapted to receive the threat information from the first peer client and use the threat information to examine the second peer client for the malware entity.

2. The method of claim 1, wherein there is system variance between the first peer client and the second peer client, and the threat information associated with the malware entity is unaffected by the system variance.

3. The method of claim 1, wherein the detected malware entity possesses polymorphic variance, and the threat information associated with the malware entity is unaffected by the polymorphic variance.

4. The method of claim 1, wherein the detected malware entity possesses temporal variance, and the threat information associated with the malware entity is unaffected by the temporal variance.

5. A non-transitory computer-readable storage medium comprising executable program code for providing threat information, the program code comprising program code for:
  receiving, at a first peer client of a plurality of peer clients of a security server on a network, security information from the security server;
  identifying, using the security information, a threat detection event indicating a detection of a malware entity at the first peer client;
  identifying, at the first peer client, threat information associated with the malware entity responsive to the threat detection event, the threat information for detecting the malware entity wherein at least some of the threat information is unaffected by variance associated with the malware entity; and
  transmitting the threat information from the first peer client to a second peer client of the plurality of peer clients on the network, wherein the second peer client is adapted to receive the threat information from the first peer client and use the threat information to examine the second peer client for the malware entity.

6. The computer-readable storage medium of claim 5, wherein there is system variance between the first peer client and the second peer client, and the threat information associated with the malware entity is unaffected by the system variance.

7. The computer-readable storage medium of claim 5, wherein the detected malware entity possesses polymorphic variance, and the threat information associated with the malware entity is unaffected by the polymorphic variance.

8. The computer-readable storage medium of claim 5, wherein the detected malware entity possesses temporal variance, and the threat information associated with the malware entity is unaffected by the temporal variance.

9. A computer system for providing threat information, the system comprising:
  a non-transitory computer-readable storage medium storing executable computer program modules comprising:

a peer threat reporting module for receiving, at a first peer client of a plurality of peer clients of a security server on a network, security information from the security server;

a malware detection module for identifying, using the security information, a threat detection event indicating a detection of a malware entity at the first peer client; and a peer threat evaluation module for identifying, at the first peer client, threat information associated with the malware entity responsive to the threat detection event, the threat information for detecting the malware entity wherein at least some of the threat information is unaffected by variance associated with the malware entity;

the peer threat reporting module further for transmitting the threat information to a second peer client of the plurality of peer clients on the network, wherein the second peer client is adapted to receive the threat information from the first peer client and use the threat information to examine the second peer client for the malware entity; and a processor configured to execute the computer program modules.

10. The system of claim 9, wherein there is system variance between the first peer client and the second peer client, and the threat information associated with the malware entity is unaffected by the system variance.

11. The system of claim 9, wherein the detected malware entity possesses polymorphic variance, and the threat information associated with the malware entity is unaffected by the polymorphic variance.

12. The system of claim 9, wherein the detected malware entity possesses temporal variance, and the threat information associated with the malware entity is unaffected by the temporal variance.

13. The method of claim 1, wherein the identified threat information is invariant over system variance and temporal variance, and the identified threat information comprises at least one of:
   a size of the malware entity;
   a date that the malware entity was last executed or downloaded;
   a source of the malware entity;
   a name associated with the malware entity;
   one or more registration keys generated by the malware entity; and
   a type of the malware entity.

14. The method of claim 1, wherein the plurality of peer clients are connected by a local area network (LAN) and further comprising:
   recognizing, by the plurality of peer clients, other peer clients connected to the LAN; and
   organizing, by the plurality of peer clients, the recognized peer clients into a set of peers.

15. The method of claim 1, wherein the first peer client transmits the threat information to the second peer client using a secure communication channel.

16. The method of claim 1, wherein the first peer client transmits the threat information directly to the second peer client.

* * * * *